E. C. BERRIMAN.
TAILOR'S MEASURING INSTRUMENT.
APPLICATION FILED NOV. 29, 1918.
1,435,275.  Patented Nov. 14, 1922.
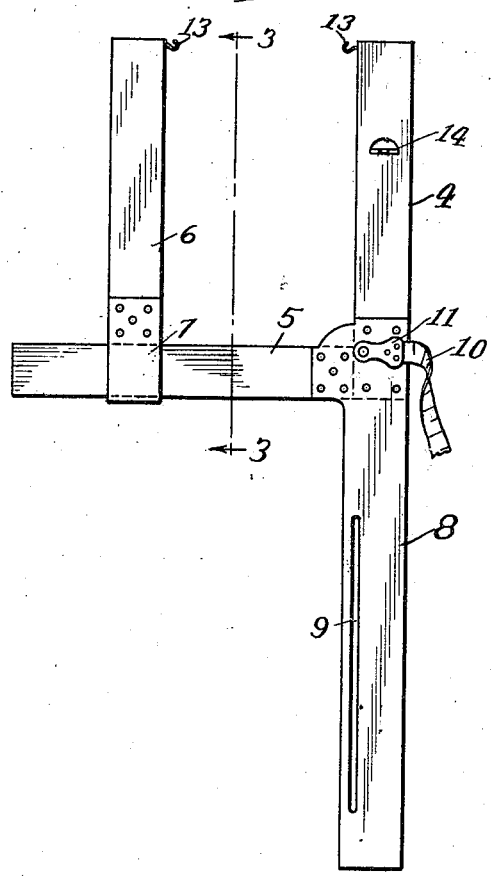
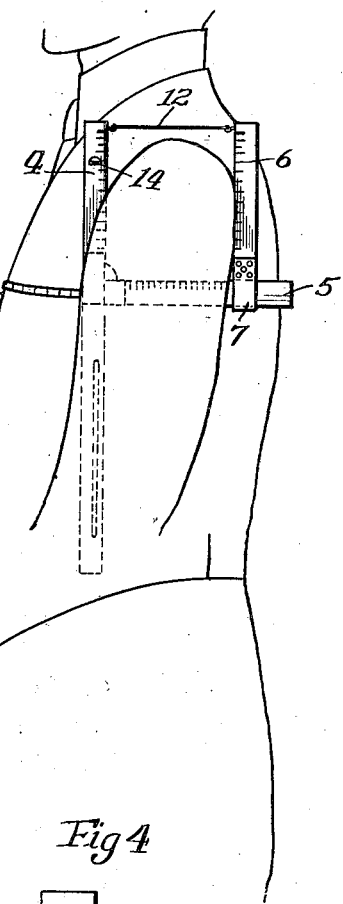
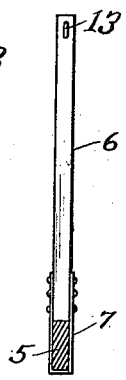
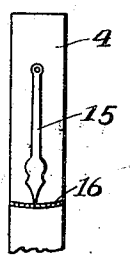
Inventor
Edward C. Berriman Patented Nov. 14, 1922.

1,435,275

UNITED STATES PATENT OFFICE.

EDWARD C. BERRIMAN, OF CHICAGO, ILLINOIS.

TAILOR'S MEASURING INSTRUMENT.

Application filed November 29, 1918. Serial No. 264,507.

*To all whom it may concern:*

Be it known that I, EDWARD C. BERRIMAN, a citizen of the United States, residing at Chicago, in the county of Cook and State of Illinois, have invented certain new and useful Improvements in Tailors' Measuring Instruments, of which the following is a specification.

This invention relates to measuring instruments and its object is to provide an instrument for use by unskilled persons with which to take measurements of an individual which will enable a tailor to build a coat and a vest to fit the individual as well as if he had presented himself to the tailor personally for measurement and fitting in the usual way.

A large tailoring trade now exists where a centrally located tailoring establishment has agents throughout the country whose business it is to take orders on cloth samples and make measurements of customers and deliver suits to the customers, the suits being made by the tailoring establishment which never comes in contact directly with the customer. It is a well-known fact that individuals of the same size and general shape will differ so materially in physical characteristics that a suit, and particularly a coat, made for one will not properly fit another, and due to the difficulty of imparting information regarding such characteristics as supplementary to the usual tailoring measurements employed, and due also to the fact that so many different agents, all generally unskilled in the art of tailoring, are employed in making such measurements, the tailoring establishment is dependent upon the skill of its cutters and other employes to determine from the information received from its agents those niceties of fit which the tailor usually determines by a personal fitting on the customer.

I have demonstrated that with the aid of certain instruments an agent may make measurements of an individual which will enable a tailor without seeing the customer and without a conjecture to build a garment, and particularly a coat and a vest, which will fit the customer just as well as if he had been personally measured and fitted by the tailor in the usual way, and the object of this invention is to provide one of the instruments for making such measurements.

In the accompanying drawings illustrating a simple and preferred embodiment of the invention Fig. 1 illustrates the instrument applied to a figure as in actual use;

Fig. 2 is a somewhat enlarged plan view showing the other side of the instrument;

Fig. 3 is a detail view, partly in section, on the line 3—3 of Fig. 2; and

Fig. 4 is a detail view of another form of leveling device.

Referring to the drawings, 4 is an upright arm and 5 is a horizontal arm rigidly fastened together at a right angle to each other, and 6 is an upright arm slidably mounted on the horizontal arm 5. The arm 6 is fastened to a slide 7 which is arranged to slide on the horizontal arm. These three arms are preferably made of wood and are of sufficient size to embrace an individual's arm at the shoulder, as indicated in Fig. 1. A flexible metal strip 8 is fastened at one end to the arms 4 and 5 at their juncture and this strip extends downward from the arm 5 in substantial alinement with the arm 4 but is somewhat wider than the arm 4 and provided with a longitudinal slot 9 which alines with the inner edge of the arm 4. A tape 10 is fastened by a swivel connection 11 to the arms 4 and 5 adjacent the inner corner of their juncture so that it may be swung to various positions as required for taking the desired measurements. An elastic band 12 or other device may be employed for holding the arm 6 in adjusted relation to the arm 4 and for preventing the upper ends of these arms from spreading, and this band may be engaged with hooks 13 or other devices conveniently located at the upper ends of the arms. I prefer also to provide a spirit level in the arm 4 by means of which the instrument may be properly positioned on the customer.

I have found in practice that the most reliable measurements for insuring the proper fit and drape of a coat should be made from the hollow of the left arm as a starting point and, therefore, I arrange this instrument upon the left arm of a customer in the manner illustrated in Fig. 1, with the horizontal arm close up in the hollow of the left arm, the rigid arm 4 close against the front part of the shoulder and the sliding arm 6 adjusted snugly against the back of the shoulder. When the instrument has been thus arranged I prefer to connect the upper ends of the arms 4 and 6 with an elastic band 12, but this is not essential and may be dispensed with if the sliding arm is otherwise held in adjusted position.

Then the tape may be used to take measurements to the center of the chest and to the center of the back of the customer, these centers having been previously determined preferably by use of the instrument described in my application Serial No. 264,506 filed concurrently herewith. Adding these two measurements together and multiplying by two will give the exact chest measurement of the customer and indicate to the tailor how much cloth should be put forward and how much back of the medial line of the customer viewed from the left side. Then measurements may be taken by passing the tape up and over the shoulder to a center at the back of the collar, and then to the center of the back which will indicate to the tailor, with the other measurements the amount of cloth to be used on the shoulder and the size of the arm hole, after which measurements may be taken with the tape to determine the length of the coat. These measurements will enable a tailor to build a coat which will fit the customer correctly and which will drape properly as well as could be done if the tailor personally measured and fitted the customer in the usual way.

It is often possible for an individual to purchase a ready-made suit which will fairly fit his figure but owing to the many different physical characteristics of individuals it is rarely possible to obtain a ready-made coat which will have the proper balance on the individual and drape properly even though it may apparently fit him. With my invention it is possible for an unskilled person to take measurements to enable a tailor to make a coat which will fit and drape properly with the proper balance.

The flexible strip 8 is provided so that it may be pressed gently but snugly against the waist of the customer and a chalk mark made through the slot 9 to cross a horizontal chalk line to provide a center from which waist and other measurements may be made.

While I prefer, for the reasons stated, to make these measurements with the device applied to the left shoulder of the customer I do not wish to confine the invention to this particular use nor do I desire to limit myself to the particular form and proportion of parts and details of construction, shown and described, but reserve the right to make any changes therein which fairly fall within the scope of the appended claim. For example, instead of the spirit level 14 I may use a pivoted index 15 (Fig. 4) which is preferably weighted to swing freely across a gauge 16 suitably marked to indicate when the instrument is level.

The instrument may be employed in making measurements for shirts in much the same way as hereinbefore described.

I claim:

A measuring instrument comprising an upright arm and a horizontal arm connected at a right angle to each other, and a flexible metal strip mounted on the horizontal arm and extending therefrom in a direction opposite to the upright arm, said metal strip having a longitudinal slot therein one edge of which is aligned with an edge of said upright arm.

EDWARD C. BERRIMAN.

Witness:
   M. A. KIDDIE.